US011645800B2

(12) United States Patent
Orvalho et al.

(10) Patent No.: US 11,645,800 B2
(45) Date of Patent: *May 9, 2023

(54) ADVANCED SYSTEMS AND METHODS FOR AUTOMATICALLY GENERATING AN ANIMATABLE OBJECT FROM VARIOUS TYPES OF USER INPUT

(71) Applicant: Didimo, Inc., Oporto (PT)

(72) Inventors: Verónica Costa Teixeira Pinto Orvalho, Oporto (PT); Eva Margarida Ferreira de Abreu Almeida, Oporto (PT); Hugo Miguel dos Reis Pereira, Oporto (PT); Thomas Iorns, Porirua (NZ); José Carlos Guedes dos Prazeres Miranda, Oporto (PT); Alexis Paul Benoit Roche, Oporto (PT); Mariana Ribeiro Dias, Oporto (PT)

(73) Assignee: Didimo, Inc., Oporto (PT)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,500

(22) Filed: Jul. 30, 2021

(65) Prior Publication Data
US 2021/0358189 A1    Nov. 18, 2021

Related U.S. Application Data

(63) Continuation-in-part of application No. 16/555,866, filed on Aug. 29, 2019, now Pat. No. 11,182,945.

(51) Int. Cl.
*G06T 13/20* (2011.01)
*G06T 17/00* (2006.01)
*G06T 15/04* (2011.01)

(52) U.S. Cl.
CPC .............. *G06T 13/20* (2013.01); *G06T 15/04* (2013.01); *G06T 17/00* (2013.01); *G06T 2200/04* (2013.01); *G06T 2200/08* (2013.01)

(58) Field of Classification Search
CPC ......... G06T 13/20; G06T 15/04; G06T 17/00; G06T 2200/04; G06T 2200/08;
(Continued)

(56) References Cited

U.S. PATENT DOCUMENTS 10,379,719 B2    8/2019   Scapel et al.
10,796,468 B2    10/2020  Orvalho et al.
(Continued)

FOREIGN PATENT DOCUMENTS

EP         3759692 A1      1/2021
WO     WO2019162420 A1     8/2019
(Continued)

OTHER PUBLICATIONS

Orvalho et al., "A Facial Rigging Survey", Eurographics: STAR—State of The Art Report, 2012, 22 pages.
(Continued)

*Primary Examiner* — Daniel F Hajnik
(74) *Attorney, Agent, or Firm* — Carr & Ferrell LLP

(57) ABSTRACT

Dynamically customized animatable 3D models of virtual characters ("avatars") are generated in real time from multiple inputs from one or more devices having various sensors. Each input may comprise a point cloud associated with a user's face/head. An example method comprises receiving inputs from sensor data from multiple sensors of the device (s) in real time, and pre-processing the inputs for determining orientation of the point clouds. The method may include registering the point clouds to align them to a common reference; automatically detecting features of the point clouds; deforming a template geometry based on the features to automatically generate a custom geometry; determining a texture of the inputs and transferring the texture to the custom geometry; deforming a template control structure based on the features to automatically generate a custom
(Continued)

control structure; and generating an animatable object having the custom geometry, the transferred texture, and the custom control structure.

19 Claims, 9 Drawing Sheets

(58) Field of Classification Search
CPC ... G06T 2210/56; G01B 11/245; G01B 11/25; G01B 2210/52
See application file for complete search history.

(56) References Cited

U.S. PATENT DOCUMENTS

| | | | |
|---|---|---|---|
| 11,062,494 | B2 | 7/2021 | Orvalho et al. |
| 11,182,945 | B2 | 11/2021 | Orvalho et al. |
| 11,508,107 | B2 | 11/2022 | Orvaiho et al. |
| 2003/0137515 | A1 | 7/2003 | Cederwall et al. |
| 2009/0055190 | A1 | 2/2009 | Filev et al. |
| 2009/0135176 | A1 | 5/2009 | Snoddy et al. |
| 2010/0007665 | A1 | 1/2010 | Smith et al. |
| 2010/0149177 | A1 | 6/2010 | Miller |
| 2011/0175921 | A1 | 7/2011 | Havaldar et al. |
| 2011/0267344 | A1 | 11/2011 | Germann et al. |
| 2012/0323581 | A1 | 12/2012 | Strietzel |
| 2014/0043329 | A1 | 2/2014 | Wang et al. |
| 2014/0085293 | A1 | 3/2014 | Konoplev et al. |
| 2014/0160123 | A1 | 6/2014 | Yang |
| 2015/0173715 | A1 | 6/2015 | Raghavan et al. |
| 2015/0215249 | A1 | 7/2015 | Bruns-Bielkowicz et al. |
| 2015/0287403 | A1 | 10/2015 | Holzer Zaslansky et al. |
| 2016/0088284 | A1 | 3/2016 | Sareen et al. |
| 2016/0148435 | A1 | 5/2016 | Li et al. |
| 2017/0053663 | A1 | 2/2017 | Yu et al. |
| 2017/0365231 | A1 | 12/2017 | Rider et al. |
| 2017/0372505 | A1 | 12/2017 | Bhat et al. |
| 2018/0018787 | A1 | 1/2018 | Giancola et al. |
| 2018/0054466 | A1 | 2/2018 | Blattner et al. |
| 2018/0139436 | A1 | 5/2018 | Yucer et al. |
| 2018/0336737 | A1 | 11/2018 | Varady et al. |
| 2019/0035131 | A1 | 1/2019 | Hutchinson et al. |
| 2019/0035149 | A1 | 1/2019 | Chen et al. |
| 2019/0266773 | A1 | 8/2019 | Orvalho et al. |
| 2019/0279410 | A1 | 9/2019 | Orvalho et al. |
| 2021/0012550 | A1 | 1/2021 | Orvalho et al. |
| 2021/0065420 | A1 | 3/2021 | Orvalho et al. |
| 2021/0328954 | A1 | 10/2021 | Orvalho et al. |

FOREIGN PATENT DOCUMENTS

| | | |
|---|---|---|
| WO | WO2019173108 A1 | 9/2019 |
| WO | WO2021040896 A1 | 3/2021 |

OTHER PUBLICATIONS

Ichim et al., "Dynamic 3D Avatar Creation from Hand-help Video Input", ACM Transactions on Graphics, Jul. 27, 2015, 14 pages.
"Invitation to Pay Additional Fees", Patent Cooperation Treaty Application No. PCT/EP2019/054390, dated Mar. 27, 2019, 17 pages.
Dutreve et al., "Easy rigging of face by automatic registration and transfer of skinning parameters", Inernational Conference on Computer Vision and Graphics, Apr. 3, 2017, 9 pages.
"International Search Report" and "Written Opinion of the International Searching Authority," Patent Cooperation Treaty Application No. PCT/US2019/020140, dated May 17, 2019, 8 pages.
"International Search Report" and "Written Opinion of the International Searching Authority," Patent Cooperation Treaty Application No. PCT/EP2019/054390, dated May 22, 2019, 17 pages.
"Category:Line drawings of facial expressions", Wikimedia Commons, Retrieved from "https://commons.wikimedia.org/w/index.php?title=Category:Line_drawings_of_facial_expressions&oldid=329552043", Nov. 27, 2018, 11 pages.
"Morph target animation." Wikipedia, Retrieved from "https://en.wikipedia.org/wiki/Morph_target_animation", Aug. 29, 2019.
"International Search Report" and "Written Opinion of the International Searching Authority," Patent Cooperation Treaty Application No. PCT/US2020/041674, dated Nov. 3, 2020, 10 pages.
Orvalho et al., "Advanced Electronic Messaging Utilizing Animatable 3D Models", U.S. Appl. No. 17/361,100, filed Jun. 28, 2021, 55 pages.
"Office Action", Canada Patent Application No. 3090747, dated Aug. 19, 2021, 4 pages.
Li et al., "Realtime facial animation with on-the-fly correctives", ACM Trans. Graph., Jul. 1, 2013, 9 pages.
Loconsole et al., "Real-time emotion recognition novel method for geometrical facial features extraction", IEEE, 2014 International Conference on Computer Vision Theory and Applications (VISAPP), Jan. 5, 2014, 8 pages.
Malciu et al., "Tracking facial features in video sequences using a deformable-model-based approach." Mathematical Modeling, Estimation, and Imaging. vol. 4121. International Society for Optics and Photonics, 2000. (Year: 2014), 13 pages.

ADVANCED SYSTEMS AND METHODS FOR AUTOMATICALLY GENERATING AN ANIMATABLE OBJECT FROM VARIOUS TYPES OF USER INPUT

CROSS-REFERENCE TO RELATED APPLICATIONS

This continuation-in-part application claims the priority benefit of U.S. Nonprovisional patent application Ser. No. 16/555,866, filed Aug. 29, 2019, which is hereby incorporated by reference in its entirety. This application is related to U.S. Nonprovisional patent application Ser. No. 15/905,667, filed Feb. 26, 2018, U.S. Nonprovisional patent application Ser. No. 16/289,363, filed Feb. 28, 2019, and U.S. Nonprovisional patent application Ser. No. 17/361,100, filed Jun. 28, 2021, which applications are incorporated by reference in their entirety herein.

FIELD

The present technology relates generally to animatable 3D models, and more particularly to systems and methods for automatically generating custom meshes and rigging for animatable 3D models from various user input.

BACKGROUND

The approaches described in this section could be pursued, but are not necessarily approaches previously conceived or pursued. Therefore, unless otherwise indicated, it should not be assumed that any of the approaches described in this section qualify as prior art merely by virtue of their inclusion in this section.

An animatable 3D model of a virtual character is a computer graphic representation having a geometry or mesh, which may be controlled by a rig or control structure. The rig or control structure attaches to areas of the mesh, and affects those areas of the mesh in accordance with geometric operations applied.

Facial animation has been done through motion capture and/or manually by skilled artists, who carefully manipulate animation controls to create the desired motion of the facial model. Even with the use of rigs or control structures, the particular process of manipulating the rigs to produce realistic and believable facial movements is difficult and dependent upon minute manipulation by animation experts. Since each face is unique, a mesh and rig of each 3D facial model must be individually customized for the particular desired facial structure.

Conventional processes for creating rigs for animation can be time consuming, costly, and dependent upon subjective human involvement. In addition, conventional processes are characteristically limited to processing only certain user inputs with flexibility as to those inputs. As such, a long felt need exists for automatic and objective animatable solutions to create 3D objects including 3D facial models from various types and forms of user input.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In general, various embodiments of the present disclosure are directed to automatic solutions for three dimensional (3D) scanning processing which can be used for generating animatable 3D objects from various different user input, including combinations of different user inputs. The method may automatically generate an animatable object from various forms and types of user input.

In various embodiments, a method is provided for creating a customized animatable 3D model from a combination of input devices and sensors, and the method comprises receiving a first input from a first device and a second input from the same first device or from a second device, each of the first input and the second input comprising a point cloud of an image associated with the face or head of a user, the first input being further associated with at least one sensor on the first device and the second input being further associated with the same at least one sensor on the first device, at least one different sensor on the first device, or at least one different sensor on at least one other device; and preprocessing the first input and second input. The preprocessing may comprise determining orientation of the point clouds for the first input and the second input. The method may further include registering the point clouds from the first and second inputs to align the preprocessed point clouds to a common reference; and after registering, automatically detecting one or more features of the registered point clouds; deforming a template geometry based on the one or more detected features to automatically generate a custom geometry; determining a texture of the received first and second user inputs and transferring the texture to the custom geometry; deforming a template control structure based on the one or more detected features to automatically generate a custom control structure; and generating an animatable object having the custom geometry, the transferred texture, and the custom control structure.

A system for automatically generating an animatable object may be provided, comprising a processor and a memory for storing executable instructions, the processor executing the instructions to receive a first input from a first device and a second input from the first device or from a second device, each of the first input and second input comprising a point cloud of an image associated with the face or head of a user, the first input being associated with at least one sensor on the first device and the second input being associated with the at least one sensor, a different sensor on the first device, or at least one different sensor on at least one other device; preprocess the first and second input, comprising determining orientation of the point clouds for the first input and the second input; register the point clouds from the first and second inputs to align the preprocessed point clouds to a common reference; and after registering: automatically detect one or more features of the registered point clouds; deform a template geometry based on the one or more detected features to automatically generate a custom geometry; determine a texture of the received first and second user inputs and transferring the texture to the custom geometry; deform a template control structure based on the detected feature(s) to automatically generate a custom control structure; and generate an animatable object having the custom geometry, the transferred texture, and the custom control structure. Orientation and texture data of some level of quality may be included in the first and/or second input.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example, and not by limitation in the figures of the accompanying drawings, with like references indicating similar elements.

DETAILED DESCRIPTION

Figure 1:
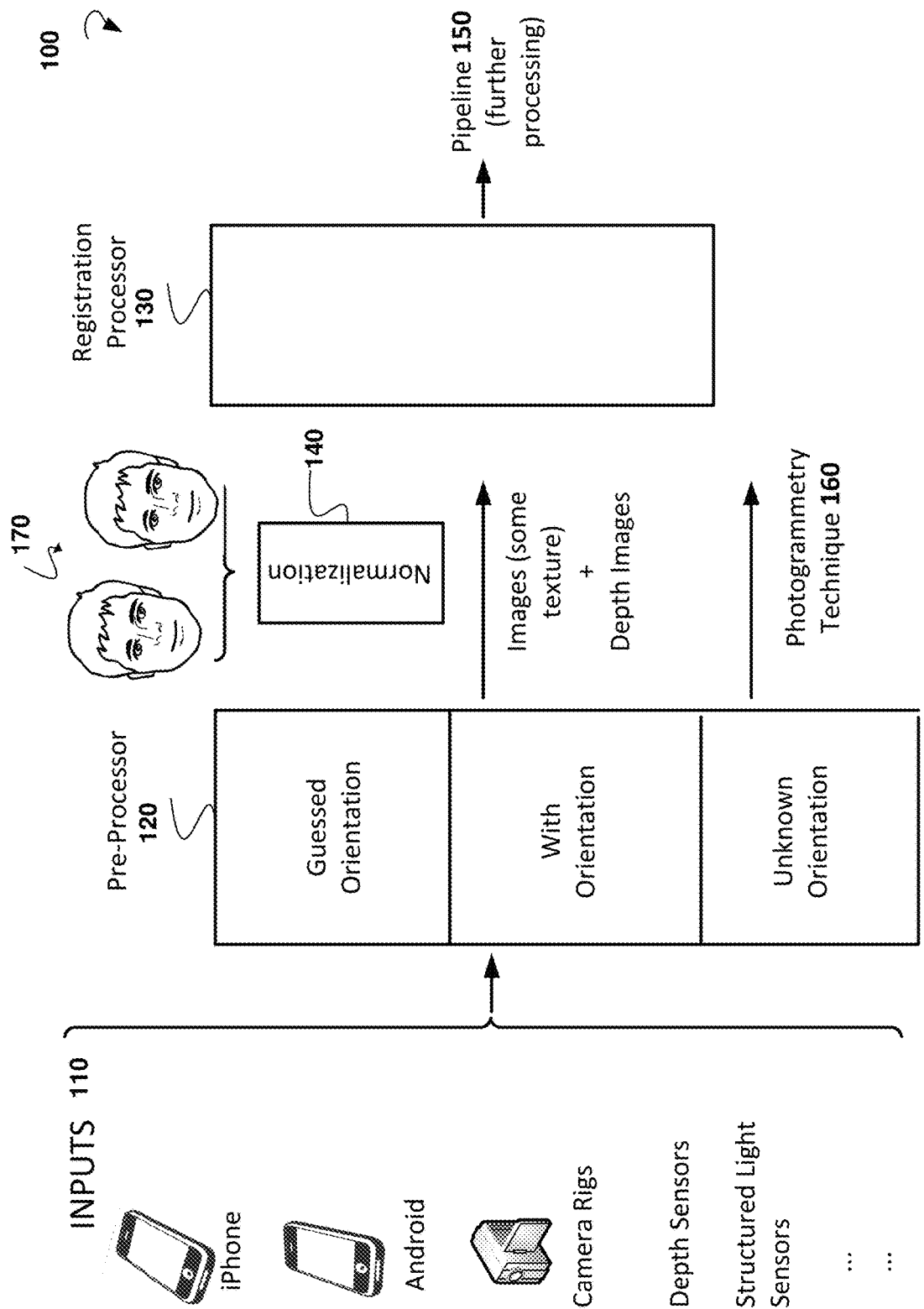
FIG. 1 is a diagram illustrating an example overall architecture and flow of the method and system for creating a customized animatable 3D model from a combination of input devices and sensors, according to various embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In general, various embodiments of the present disclosure are directed to automatic solutions for three dimensional (3D) scanning processing which can be used for generating animatable 3D objects by combining various different user inputs. The inputs can be from various sources that collect data from an object in the real world, e.g., a user's head, body, or other object. The data may concern the object's shape and in some embodiments, its color. In various embodiments, data is collected from multiple sources and combined in such a way to construct a 3D model of a user's face or body with greater quality than if just one source was used, e.g., less errors at higher resolution with higher quality texturing, while using less expensive devices/sources. The different sources may provide a point cloud of geometric samples of the object. The point cloud can be defined as a set of points in space that are produced by various scanners. These points can be used to extrapolate the shape of the object, and color (if color information is acquired).

Some sources can be very expensive such as a camera rig with depth sensors and structured light sensors, and can cost $100K or more if a large number of cameras are used in the rig as is conventionally done. The camera rig can provide high quality textures, whereas the depth sensors and structured light sensors can provide models (e.g., meshes) without textures.

Various embodiments of the present technology can much less expensively provide a high quality model with high quality textures while using input available from devices such as an iPhone, and in various embodiments combining in a unique way the input from the iPhone with inputs other smart phone devices and/or other cameras. In some embodiments, the inputs comprise input from a dot projection sensor (e.g., TrueDepth) and input(s) from a camera(s) that takes another picture of the subject face/body/object from a different perspective. Other combinations of inputs can be used to practice various embodiments of the present technology. To be sure, inputs from a camera rig/depth sensors/structured light sensors can also be combined with inputs from an iPhone, other smart device, or camera to practice various embodiments; however, it is not required to have inputs from a camera rig/depth sensor(s)/structured light sensor(s) arrangement in order to practice various embodiments. Even if a camera rig/depth sensors/structured light sensors arrangement provided some of the inputs used to practice various embodiments, not as many cameras would be needed for the camera rig to achieve the same or substantially the same level of quality as much more expensive devices and arrangements. It is common to have rigs with up to 120-170 cameras. In some configurations, known camera rigs have many more of the cameras pointing at the face or other area of interest than at the rest of the body.

Various combinations of multiple sources may be used to practice the present technology. In one non-limiting example, the multiple sources used included 70 digital single-lens reflex (DLSR) cameras as a source for the full body, and one iPhone TrueDepth camera for creating the face with high detail. In another non-limiting example, medium level detail was achieved for the face using a single time of flight (TOF) camera, e.g., Sony XPERIA mobile device.

FIG. 1 is a diagram 100 illustrating the overall architecture and flow of the method and system for creating a customized animatable 3D model from a combination of input devices and sensors, according to various embodiments. Diagram 100 includes inputs 110, pre-processor 120, registration processor 130, along with normalization processing 140 and photogrammetry technique 160.

Regarding normalization, two images 170 are shown in FIG. 1 since normalization is especially helpful when for example, a picture from one source with a particular orientation and camera characteristics is to be registered/aligned with a picture from another source with a different orientation and different camera characteristics. One of the aspects of normalization in various embodiments therefore, is to provide for having input characteristics such as point cloud resolution, orientation, initial position, and camera intrinsics available at the time of registration processing by registration processor 130.

Various user inputs 110 can be provided from various sources which may be all different. Some example sources are shown in the examples in FIG. 1 and FIG. 4 and may include, but not be limited to smartphones (e.g., IPHONE. ANDROID, XPERIA, etc. where the smartphone may have various sensors including but not limited to camera, a dot projection sensor such as a TrueDepth sensor and the like, a TOF sensor, to name a few sensors), digital cameras in a single housing (e.g., DLSR, etc.); a camera rig, depth sensors, and structured light sensors. Other suitable sources of image or video data may be used alone or in combination with other ones of the sources, according to some embodiments.

In various embodiments, the scans from a combination of sources or one source are pre-processed by pre-processor 120 and then an alignment or registration process brings the various scans into a common reference system.

After registration, other parts of the 3D scanning pipeline 150 can be performed (as described for example in U.S. Nonprovisional patent application Ser. No. 15/905,667 and U.S. Nonprovisional patent application Ser. No. 16/289,363, incorporated by reference above) to produce a complete 3D model with an automatically generated custom mesh and rigging.

Various aspects of the example architecture in FIG. 1 are described with respect to the other figures.

Figure 2:
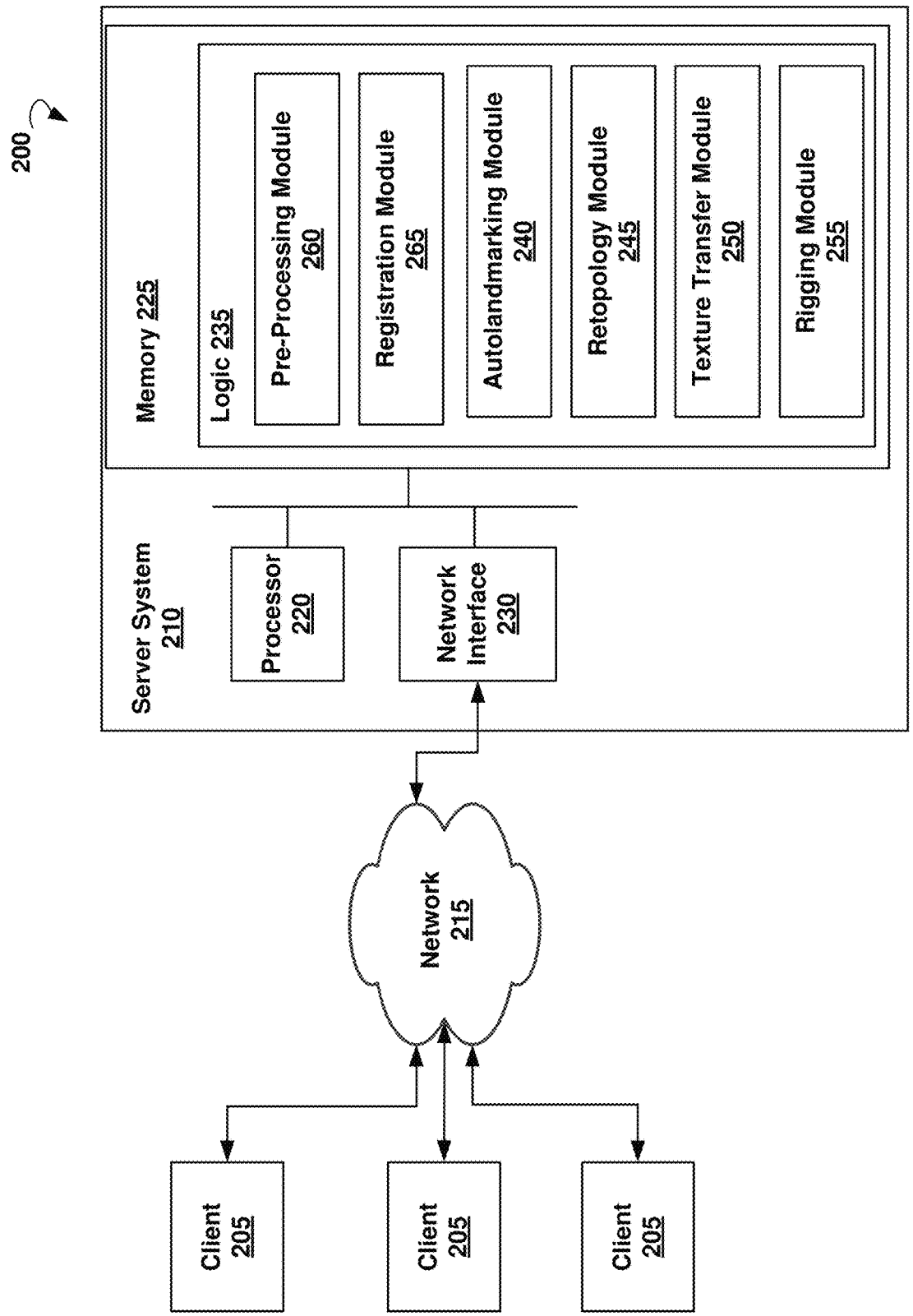
FIG. 2 is a schematic diagram of another example system architecture for practicing aspects of the present disclosure.

FIG. 2 is an example schematic diagram of an architecture 200 illustrating certain aspects of the present disclosure. The architecture 200 comprises one or more clients 205 communicatively coupled to a server system 210 via a public or private network, such as network 215.

Generally, the server system 210 is configured to provide various functionalities which are described in greater detail throughout the present disclosure. In various embodiments, the server system 210 comprises a processor 220, a memory 225, and network interface 230. According to some embodiments, the memory 225 comprises logic 235 (otherwise referred to as instructions) that may be executed by the processor 220 to perform various methods described herein. For example, the logic 235 may include pre-processing module 260 and registration module 265. The inputs and result of the processing by the pre-processing module 260 and registration module 265 may be fed to the rest of logic 235. That portion of logic 235 is referred to herein as the "pipeline" and includes autolandmarking module 240, retopology module 245, texture transfer module 250, and rigging module 255, which are configured to provide some or all of the functionalities described in greater detail herein and described in U.S. Nonprovisional patent application Ser. No. 15/905,667 and U.S. Nonprovisional patent application Ser. No. 16/289,363. Among other processing, the pipeline may provide a final step in texturing.

The client 205 may be provided with a client-side application that interacts with the server system 210 in a client/server relationship.

Pre-processing module 260 receives various inputs from one or more clients 205 and pre-processes them, e.g., with regard to orientation, as described further herein. The input can be of various types and form, e.g., time of flight (TOF) data from one or more sensors in client devices, dot projection sensor (e.g., TrueDepth) data from one or more client devices, and/or camera data from one or more client devices, camera rig data, depth sensor data, structured light sensor data, to name just several example devices.

In some embodiments, the input to the pre-processing module 260 is in the form of one or more of data from a camera rig, one or more depth sensors, and/or one or more structured light sensors, or combinations thereof. One of the inputs to the pre-processing module 260 may also be in the form of a 2D image from a camera. Further details regarding the pre-processing module 260 are included below.

Registration module 265 receives data from the pre-processing module 260 which may be in the form of point clouds of geometric samples on the surface of the object or images. The registration module 265 can align the various point clouds from different sources, and image data into a common reference system. The type of data can depend on the type of orientation, e.g., guessed, included, or unknown. Further details are provided below.

The autolandmarking module 240 may receive processed user input data from the registration (processing) module 265 which input may be, for example, in the form of a 2D image or 3D data associated with a face or head of a person, the person being imaged in some manner at client 205. The autolandmarking module 240 may automatically detect facial features (e.g. landmarks) from the processed user input data, which are unique to the face associated with the user input. In various embodiments, the automatic detection of facial features is based on machine learning algorithms on an associated database. In some embodiments, the processed user input data is not 3D but is 2D and the autolandmarking module 240 casts 2D coordinates of the detected facial features from a 2D input into 3D coordinates (e.g., spatial coordinates) associated with a template geometry.

In various embodiments, the retopology module 245 automatically deforms, based on the detected facial features, the template geometry to create a custom geometry. The template geometry may have a pre-defined set of facial features with associated coordinates. In general, vertices of the template geometry follow the morphology of the original face associated with the user input.

In some embodiments, the texture transfer module 250 determines a texture based on the user input. Some user inputs/sources may provide some texture information, so the texture transfer module 250 may use that texture information if it is sufficient, or augment it with additional texture for enhancing quality. In general, the texture transfer module 250 uses the user input as the texture, such as the 2D image or surface information of 3D input data. The texture transfer module 250 may match the texture to the custom geometry created by the retopology module. Advantageously, the custom geometry has already been deformed to match the texture given in the user input. The texture transfer module 250 may automatically map the texture to the custom geometry by associating each pixel in the user input to a corresponding vertex or surface on the custom geometry.

In some embodiments, the transferred texture is configured to adapt to an environment of the 3D model, for example, to adjust by normalization and light illumination and context.

In various embodiments, the rigging module 255 automatically generates a custom control structure based on the detected facial features. The control structure generally provides elements that allow manipulation of the custom geometry to create animation. The control structure may adapt and create key elements to deform the custom geometry during animation such that behaviors and movements are smooth and follow the morphology of the face associated with the user input. In particular, in some embodiments, the rigging module 255 deforms a template control structure based on control elements determined from the detected facial features. In general, the texture transfer module 250 and the rigging module 255 may operate in series or in parallel.

The server system 210 may then combine the custom geometry, the transferred texture, and the custom control structure to automatically generate the animatable 3D model. Thus, the final output may include accurate landmark detection, an accurate custom geometry that follows a morphology of the face associated with the user input, accurate texture mapping, and a custom control structure that allows smooth and accurate simulation of behavior and movement of the 3D model.

Another aspect of the present disclosure is that the server system 210 may utilize any template, or pre-defined, geometry and any template, or pre-defined, control structure. For example, the user may input, via the client 205, a user-defined geometry, which includes a pre-defined set of facial features with associated coordinates, to replace the template geometry in the server system 210. Likewise, the user may input, via the client 205, a user-defined control structure to replace the template control structure used by the rigging module 255 to generate the custom control structure.

Figure 3:
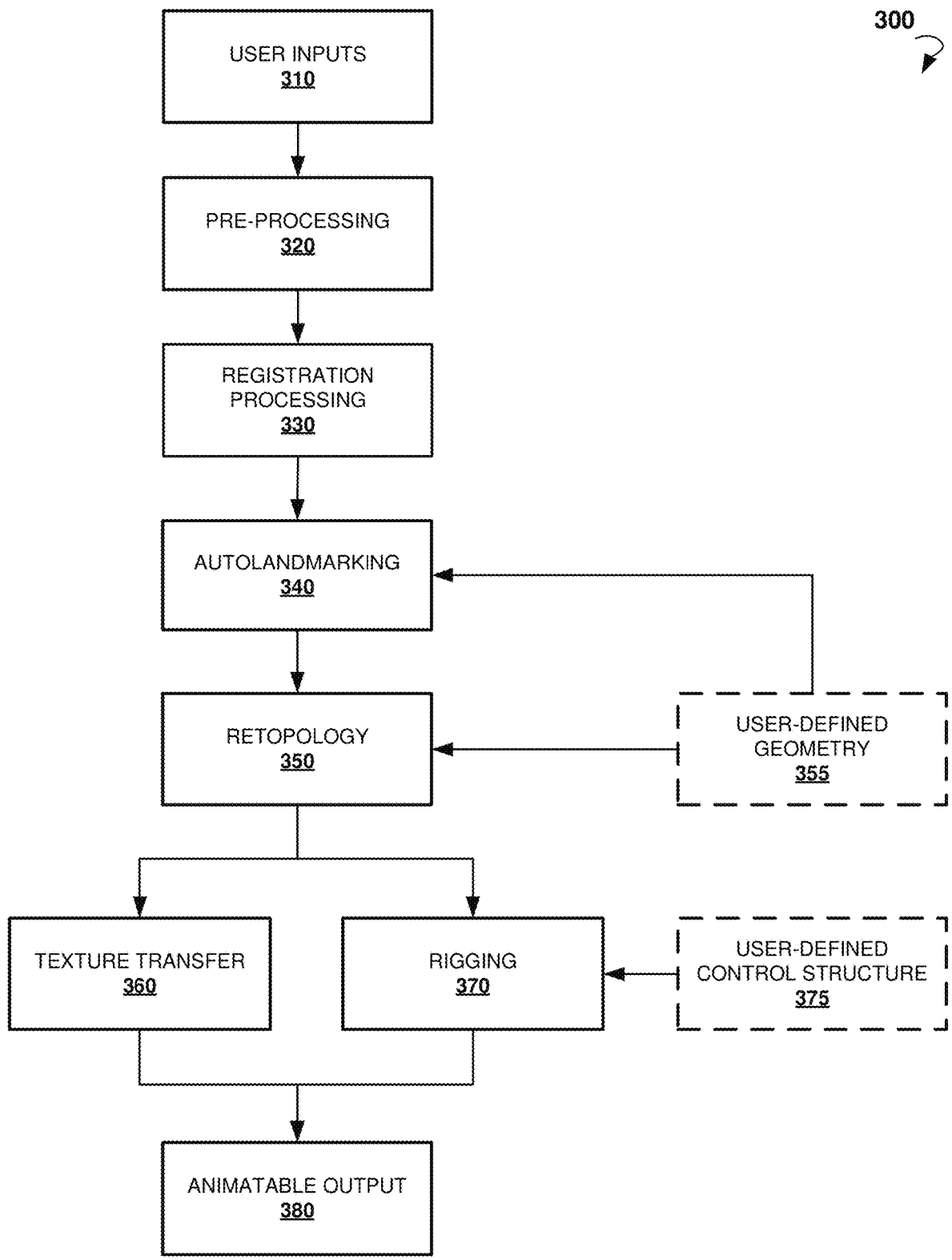
FIG. 3 is a block diagram for automatically generating an animatable object from various user inputs, according to some embodiments.

FIG. 3 depicts a block diagram of a system 300 for automatically generating a custom animatable object from various multiple inputs, according to embodiments of the present disclosure.

At block 310, user inputs are received that are indicative of a face of the user. Some of the input may indicate other aspects of the environment relative to the face. The user inputs may be an image, a frame of a video, a 3D scan, or other suitable media. It is to be understood that the user inputs may further comprise body information of the user. In such embodiments, the template geometry and template control structure would comprise approximations of the appearance and control elements of a humanoid body, and the one or more features detected by autolandmarking would include further features indicative of the body.

At block 320, pre-processing is performed to process various received inputs from client devices. The preprocessing may comprise determining orientation of the point clouds for the inputs. The inputs may variously provide unknown orientation data, provide orientation data, or be such that an estimate (guess) of the orientation can be made at the pre-processing stage as described further herein.

At block 330, registration processing is provided to at least align the preprocessed point clouds to a common reference.

In various embodiments, the remaining blocks in FIG. 3 are associated with the pipeline described with respect to FIG. 2 and referenced applications. At block 340, autolandmarking is performed to automatically detect facial features from the user input from block 310. The facial features are unique to the user. If the user input is an image or in another 2D format, the facial features are detected and stored as 2D coordinates, in some embodiments. The 2D coordinates may be converted into spatial coordinates using perspective correction, or other suitable algorithms. For example, the system may include creating an artificial 2D plane, having the user input and detected features, in front of a template 3D model. It is to be understood that the template 3D model may include a template, or generic, geometry and template, or generic, control structure. A detected feature on the 2D plane can be converted to a position in 3D space by estimating the parallax effect by knowing the depth of each feature on the template geometry and the position of the same feature on the user input. Using perspective correction techniques such as these, each detected feature is projected from the artificial 2D plane onto a 3D point. The projection results in a 3D coordinate indicative of where the detected feature should be for the custom animatable model. The depth of each template feature, as well as the relative position of the artificial 2D plane, and template 3D model, may be automatically determined based on predictions and statistics of facial morphology. In other embodiments, the depth of each spatial coordinate is pre-defined in the template geometry.

In various embodiments, the server comprises a template 3D model having a template geometry and a template control structure, also referred to as a pre-defined geometry and a pre-defined control structure, respectively. The template geometry is an approximation of what the resulting facial mesh should look like, although it is to be understood that the template geometry may be any suitable size or shape. The template control structure may be any suitable rig for controlling movement of a geometry, such as a bone-based rig, blend-shape rig, free-form deformer, physically-based model, or other suitable control structure. For example, the template control structure may comprise a pre-defined set of bones that will create facial movements that follow the morphology and behavior of a face of the template geometry.

At block 350, retopology is performed to deform the template geometry based on the detected facial features. The template geometry may include a set of template facial features that correspond to facial features detected in the autolandmarking in block 340. As such, spatial coordinates of the detected facial features are matched to corresponding spatial coordinates of the template facial features. Based on the matching, the template geometry is automatically deformed to create a custom geometry using radial basis functions, or other suitable algorithms. Advantageously, the custom geometry is clean. That is, vertices of the custom geometry follow a morphology of the face from the user input, and allow for physically correct deformation of the geometry through the control structure.

In some embodiments, block 350 includes dynamically deforming the template geometry based on a determined type of facial structure associated with the user input. For example, the server may comprise a plurality of template geometries, each template geometry corresponding to a different type of facial structure. The different types of facial structures may relate to different genders or races, for example, and reflect differences in statistical information regarding the facial morphologies of each group. As such, each template geometry may comprise different spatial coordinates for the set of generic facial features. Block 350 may further include determining which template geometry of the plurality of template geometries most closely matches the one or more detected features of the received user input, and using that template geometry, or a combination of geometries.

Likewise, the server may comprise a plurality of template models, each with different parameters for different target applications. For example, a first template model of the template models may be configured with a cinematic rig with a large number of control points and high polygon count, while a second template model of the template models may be configured for a lightweight, non-playable character in a video game with a few control points and a low polygon count. The server may select which template model to use based on user input or automatically.

Block 360 and block 370 may be performed in series or in parallel, as shown in FIG. 3. At block 360, a texture of the user input is transferred to the custom geometry automatically generated in block 350. Transferring the texture may include mapping a plurality of pixels of the user input to points in the surface of the custom geometry. At block 370, rigging is performed to automatically generate a custom control structure based on the detected facial features and the template control structure. The template control structure may include a pre-defined set of control elements, such as bones in a bone-based rig, associated with spatial coordinates. A subset of the detected facial features may be associated with control elements, herein after referred to as detected control elements of the user input. As such, spatial coordinates of the detected control elements are matched to corresponding spatial coordinates of the template control structure. Based on the matching, the template control structure is automatically deformed to create a custom control structure using radial basis functions, or other suitable algorithms. Advantageously, one or more algorithms used to deform the template control structure may be the same as the one or more algorithms used to deform the template geometry. The custom control structure provides the elements to allow for the manipulation and animation of the custom geometry, and is configured to follow the morphology of the face from the user input.

At block 380, an animatable output is automatically generated from the custom geometry, the transferred texture, and the custom control structure from blocks 350, 360, and 370. Thus the animatable object comprises a deformable, custom geometry that uses a custom control structure to generate behaviors and movement. The custom geometry, the transferred texture, and the custom control structure are all based on the user input, and thus are personalized to the unique face of the user indicative of the user input. For example, the animatable object may be a 3D model of a humanoid head having the face and morphology of the user. It is to be understood that the same methods may be applied to other physical structures, such as a body of the user. In such embodiments, the template geometry and template control structure would comprise approximations of the appearance and control elements of a humanoid body, and the feature detected by autolandmarking would include further features indicative of the body.

Advantageously, embodiments of the present disclosure are versatile and allow the user to input a user-defined template geometry and/or a user-defined template control structure, which are then used in the automatic system. If the user wants a mesh with fewer polygons or would like a control structure set up for motion capture instead of keyframe animation, for example, the user may input such a template geometry or template control structure into the system.

At optional block 355, a user-defined geometry is received. The server may store the user-defined geometry and associate the user-defined geometry with the user for future use. At block 350, the system may determine whether a user-defined geometry is stored for the user. Based on the determination, the user-defined geometry is deformed instead of the template geometry using the same methodology. In various embodiments, the system determines whether the user-defined geometry comprises the same features as the template geometry. Based on the determination, the system may dynamically and automatically adjust the features detected during autolandmarking in block 340, such that the detected features correspond to the features present in the user-defined geometry.

At optional block 375, a user-defined control structure is received. The user-defined control structure may be configured to control the behavior and movement of the user-defined geometry. The server may store the user-defined control structure and associate the user-defined control structure with the user for future use. At block 370, the system may determine whether a user-defined control structure is stored for the user. Based on the determination, rigging is performed to deform the user-defined control structure instead of the template control structure using the same methodology.

In one or more embodiments, the animatable object is dynamically and automatically generated in real-time based on a dynamic user input, for example from a video signal from a camera system. In such embodiments, the system would perform the receiving of user inputs, pre-processing, registration processing, autolandmarking, retopology, texture transfer, and rigging steps in real-time to dynamically and automatically generate the custom geometry, transferred texture, and custom control structure from the various user inputs. For example, the system may capture features of the user via autolandmarking of the dynamic user input, and map the features to both the custom geometry and the custom control structure to create the animated 3D model. Control elements of the custom control structure are configured to allow the 3D model to move according to the morphology of the user. Real-time mapping of the features to the control structure allow for smooth manipulation of the custom geometry in real-time.

Example sources for input 310 for the scan are now described in further detail; it should be appreciated that other and similar sources can be used to practice various embodiments of the present technology.

Figure 4:
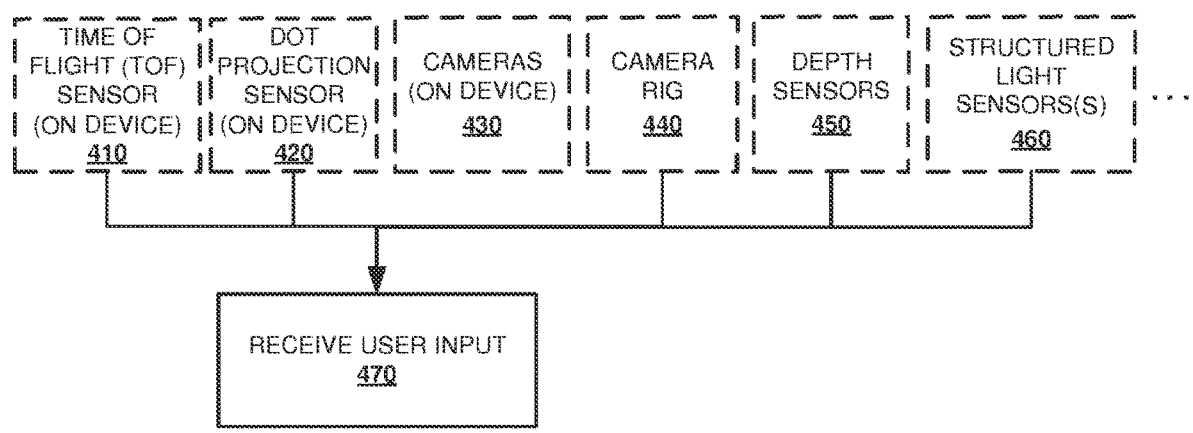
FIG. 4 is an illustration of various examples of input sources from a user, according to some embodiments.

FIG. 4 is another illustration of various examples 400 of input sources from a user, according to some embodiments. One of the possible sources (also referred to as inputs or sensors) can be a smartphone or other smart device which may provide a time-of-flight 410 sensor, a dot projection sensor (e.g., TrueDepth) sensor 420, and/or camera 430 image sensor data.

In general, the time-of-flight (TOF) sensor can refer to a camera or system that may use a 3D laser scanner using laser light to probe the object and including a TOF laser range finder. The distance to a surface of the object can be determined by the laser range finder by timing the amount of time for a pulse of laser light to travel round-trip before the reflected light from one point is detected by a detector. The laser may be a vertical cavity surface emitting laser (VCSEL) or other suitable laser technology. The TOF sensor may scan its entire field of view one point at a time by changing the range finder's direction of view.

The dot projection sensor 420 may be from a camera system on a smart device. The dot projector may shine a large number, e.g., tens of thousands of points of light onto the user's face, providing a depth map which the infrared camera can photograph for analysis. A proximity sensor and ambient light sensor may be included in the smart device for determining a suitable distance and output light levels for the process.

Some embodiments process this data in combination with data from other sources, for reconstruction as a 3D model of the face or head.

Another input sources can include the camera rig 440, the depth sensor(s) 450 and structured light sensor(s) 460 which may be used in combination to provide the received input 470. The camera rig 440 may be a device for mounting two cameras together to one 3D-system in order to photograph stereoscopic videos and images. The depth sensor(s) can be passive depth sensor(s) that may use two camera lenses, spaced slightly apart, to capture multiple images of the same object such that a depth map can be calculated based on optical flow, photogrammetry, or similar techniques.

Another possible input source is the structured light sensor 460 which can project a pattern of laser light on an object, detect distortions in the reflected pattern, e.g., using a camera offset from the pattern projector. Thus, the structured light sensor can scan multiple points or the entire field of view at once. Based on the distortions and reflected pattern a depth map can be calculated based on the geometry of the object.

Although only certain input sources and devices are detailed herein, the present technology is not limited to them; other suitable sources and device may be used to provide various point cloud, depth or other suitable data, alone or in combination with the input sources and devices detailed herein.

In various embodiments, using a combination of the various user inputs and associated sources, a 3D model including a custom geometry (e.g. mesh), a texture, and a custom control structure (e.g. rig) may be provided.

Figure 5:
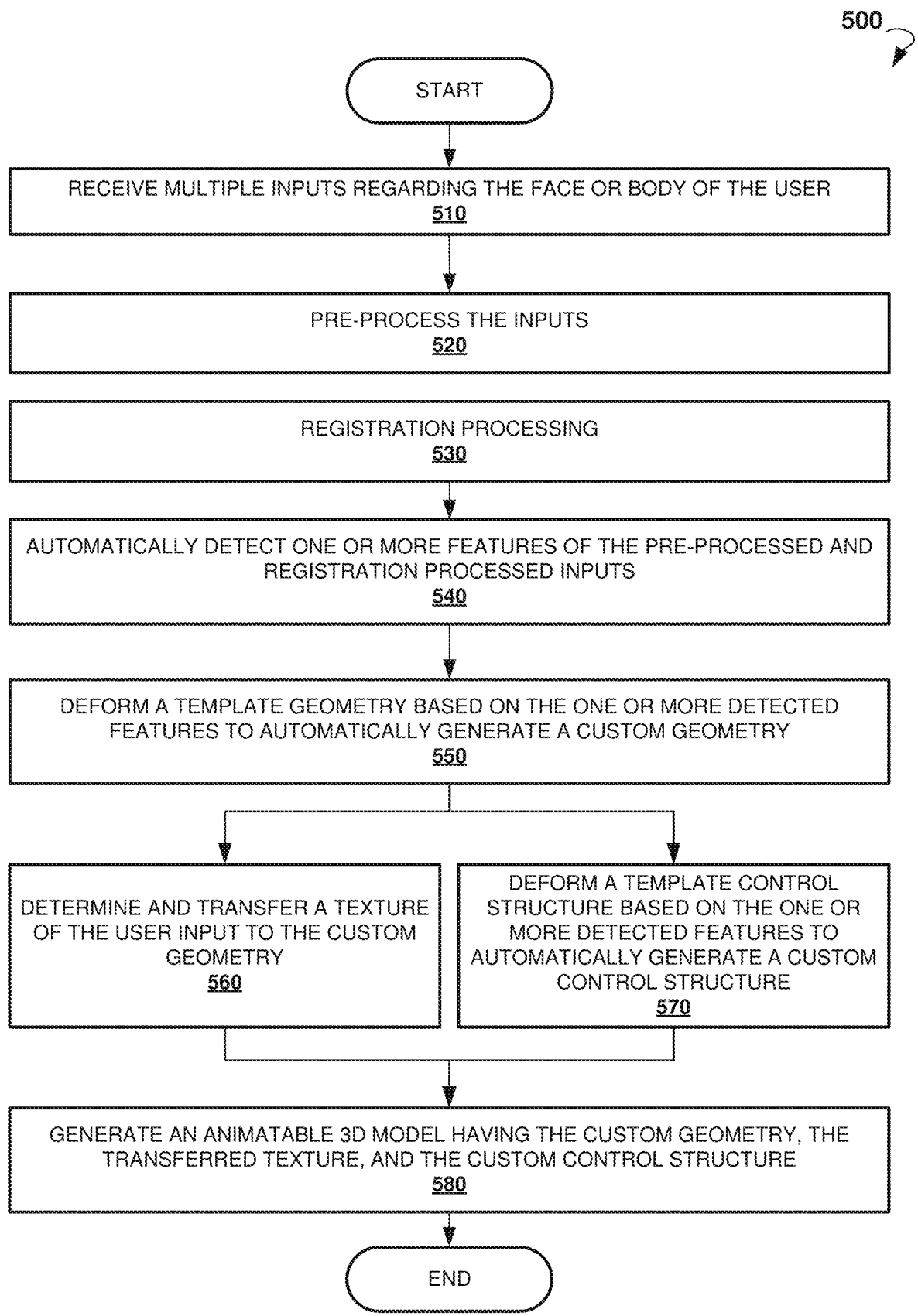
FIG. 5 is a flowchart illustrating an example method for automatically generating an animatable object from multiple user inputs from different type of sensors and devices, according to some embodiments.

FIG. 5 is a flow chart showing an exemplary method 500 for automatic generation of an animatable object from various multiple inputs. Method 500 can be performed by processing logic that includes hardware (e.g., decision-making logic, dedicated logic, programmable logic, application-specific integrated circuit), software (such as software run on a general-purpose computer system or dedicated machine), or a combination of both. In one example embodiment, the processing logic refers to one or more elements of the systems shown in FIGS. 1-4.

Operations of method 500 recited below can be implemented in an order different than described and shown in FIG. 5. Moreover, the method 500 may have additional operations not shown herein, but which can be evident to those skilled in the art from the present disclosure. Method 500 may also have fewer operations than shown in FIG. 5 and described below.

The method 500 may commence in operation 510 with receiving multiple inputs regarding the face and/or body of the user. In various embodiments, the user inputs can include at least one of an image, a video signal, and a 3D scan, which may be indicative of a face and/or body of a user. In certain embodiments, each of the user inputs is received from a client device via a network. It is to be understood that each operation of the method 500 may be performed in real-time, such that a dynamic user input such as a video signal is permitted to be input to automatically generate a dynamic 3D model that follows a morphology of the user input in real-time.

Pre-processing 520 and registration processing 530 can be included in the example in FIG. 5 due the use of various user inputs of different types and providing the flexibility of having other user inputs (e.g., that provide point cloud data) from sources in the future. The user inputs 510, preprocessing 520, and registration processing 530 are described further herein.

Operation 520 includes pre-processing the multiple inputs in example embodiments. In various embodiments, the pre-processing depends on whether orientation data for the point cloud is provided along with the point cloud data or can be estimated; such that there is different pre-processing is performed if the data includes orientation, is without orientation, or if an estimate (e.g., a guess) of the orientation is performed, also referred to herein as a guessed orientation. In other words, the preprocessing in operation 520 may comprise interpreting the received input, classified into one of three categories depending on the available information: (1) with orientation—where the sensor is in a fixed known position/orientation, e.g., camera rigs, this may require calibration, according to some embodiments; (2) unknown orientation—where the sensor/cameras are in an unknown position, and this data is sent directly for photogrammetry processing in some embodiments. The produced model may later be used as one of the inputs; and (3) guessed—where the input sensor position/orientation directly relates to the scanned material, e.g., smartphones with positional sensors, where data changes when the sensor is moved.

For example, if a camera rig having three or four cameras provided inputs along with an iPhone providing Dot projection sensor (e.g., TrueDepth) sensor data input, the orientation of each of the three or four cameras where all four cameras shoot at the same time can be fed to the pre-processing to extract the locations of each of the cameras. In some embodiments, all of the cameras need not fire at exactly the same time. For data with unknown orientation, photogrammetric processing may be used. For example, if some inputs were from a camera or cameras where the camera operator goes around the object and take multiple pictures on foot, this may be classified as unknown orientation since the system may have no idea at what precise location those photos were taken from. The photogrammetric process may include quantifying each of the point clouds for the images from the inputs regarding location with respect to the face or head of the user. The photogrammetric processing and feeding data to the same, can be time consuming whereas having the orientation data based on the inputs or being able to estimate the orientation can provide a substantial improvement in processing speed. For example, to register the point clouds in operation 530, if there is at least an estimate (guess) of the orientation of the point clouds, the point clouds can be combined at 30 frames per second, 30 images per second, for example.

In some embodiments, for data that includes orientation provided to the registration processing, image (texture) and depth image is provided by the pre-processing.

Operation 530 includes registration processing the pre-processed inputs in this example embodiment. The registration process can align the various point clouds from different sources to one another, and image data to one another, into a common reference system. In various embodiments, a rigid transformation matrix is applied to move a point cloud relative to other point cloud(s) for aligning and converging for the registration. Other suitable alignment techniques for the alignment may be employed for the registration, in some embodiments.

Operation 540 includes automatically detecting one or more features of the received user input. The automatically detecting of one or more features may include determining a set of spatial coordinates via ray casting techniques, each spatial coordinate associated with one of the one or more features of the received user input. In one or more embodiments, operation 540 includes casting a two-dimensional coordinate of each of the one or more detected features onto a template geometry using the perspective correction techniques.

The method 500 may proceed in operation 550 with deforming a template geometry based on the one or more detected features to automatically generate a custom geometry. In some embodiments, a set of features of the template geometry corresponds to the one or more detected features. The deforming the template geometry may include matching the spatial coordinates of the one or more detected features to the set of features of the template geometry, and based on the matching, applying a radial basis function to the spatial coordinates of the one or more detected features and the set of features of the template geometry. The application of the radial basis function may produce vertices of the custom geometry which are based on the spatial coordinates of the one or more detected facial features.

In certain embodiments, the template geometry is a user-defined geometry received from a client device. The method 500 may further include storing the user-defined geometry as being associated with the client device.

Operation 560 and operation 570 may be performed in parallel, as shown in FIG. 5. Operation 560 may include determining and transferring a texture of the received user input to the custom geometry. In certain embodiments, the transferring the texture to the custom geometry includes automatically mapping at least one pixel of the texture to a corresponding point on the surface of the custom geometry. For some inputs, texture data may be provided, although the quality can vary considerably, e.g., from the iPhone which provides low quality or no texturing data while camera rig(s) which may be used in combination with depth sensor(s) and SLS configuration provide high quality texturing data.

In various embodiments, operation 570 includes deforming a template control structure based on the one or more detected features to automatically generate a custom control structure. A set of control elements of the template control structure may correspond to a subset of the one or more detected features. The deforming the template control structure may include matching the subset of the one or more detected features to the set of control elements of the template control structure, and based on the matching, applying a radial basis function to the subset of the one or more detected features and the set of control elements. The application of the radial basis function may produce control elements of the custom control structure which are based on spatial coordinates of the subset of the one or more detected facial features.

In certain embodiments, the template control structure is a user-defined control structure received from a client device. The method 500 may further include storing the user-defined control structure as being associated with the client device.

At operation 580, an animatable object is automatically generated having the custom geometry, the transferred texture, and the custom control structure.

Figure 6:
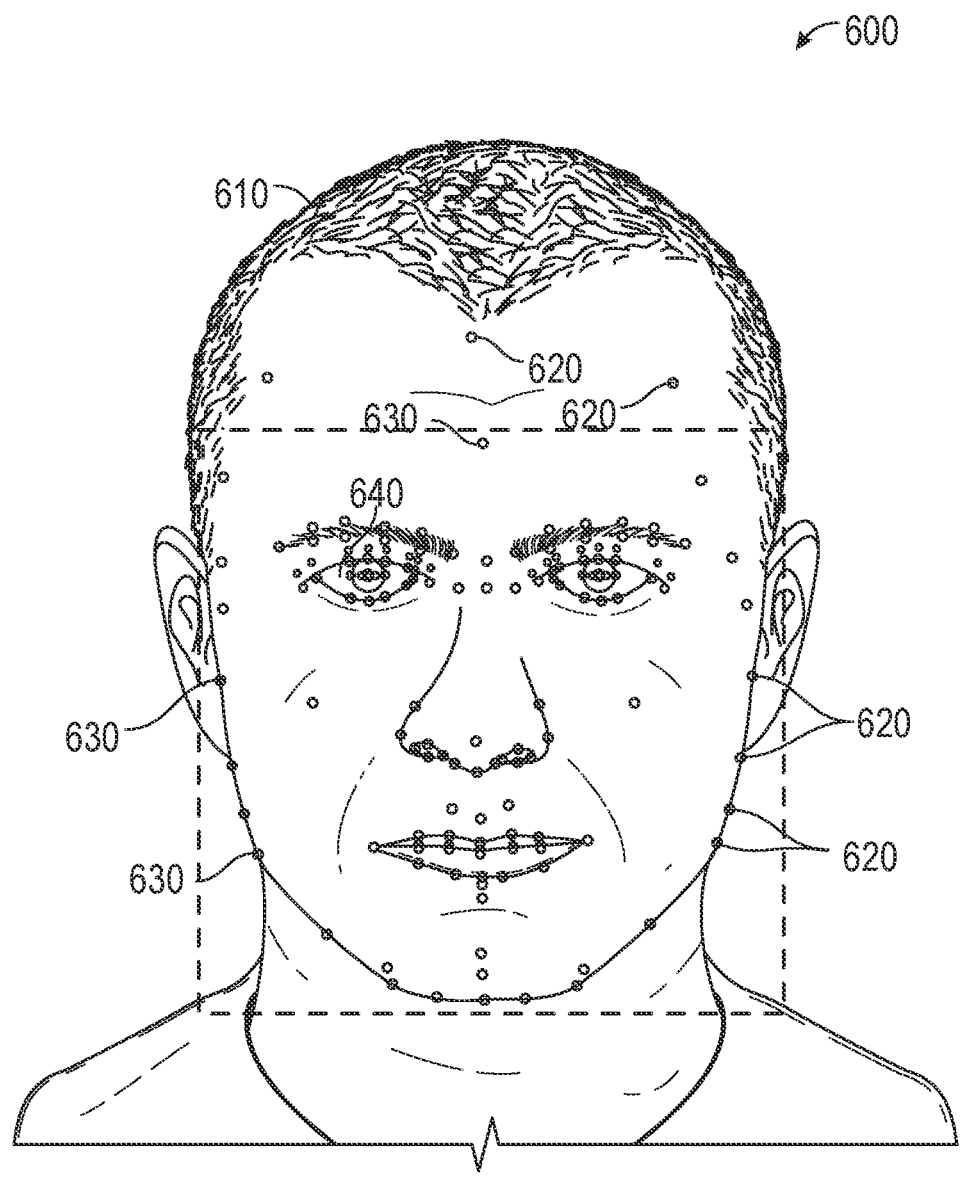
FIG. 6 is an example user input having one or more facial features detected via autolandmarking.

Regarding autolandmarking, FIG. 6 an example user input 600 indicative of a user's face 610 having one or more facial features 620, 630, 640 detected via autolandmarking. Each of the one or more detected facial features 620, 630, 640 is represented by a circle over the user input 600, though for ease of illustration only some of the one or more detected facial features 620, 630, 640 are marked with a reference number. The one or more detected facial features 620, 630, 640 may be described as a set of rules which control the automatic generation of the custom geometry and custom control structure and configure the resulting animatable 3D model to follow the morphology of the face 610. In one or more embodiments, a first set of facial features 620 may be used in the deformation of the template geometry to the custom geometry. A second set of facial features 630 may facilitate alignment and scale, while a third set of facial features 640 may be used to determine coloring (e.g., eye coloring). In such an example, the set of facial features for only one eye may be necessary to determine the eye color. It is to be understood that the identification of any particular detected facial feature 620, 630, 640 in FIG. 6 is exemplary and different combinations of detected facial features, and designation of the type of detected facial features, are contemplated by the present disclosure.

Figure 7A:
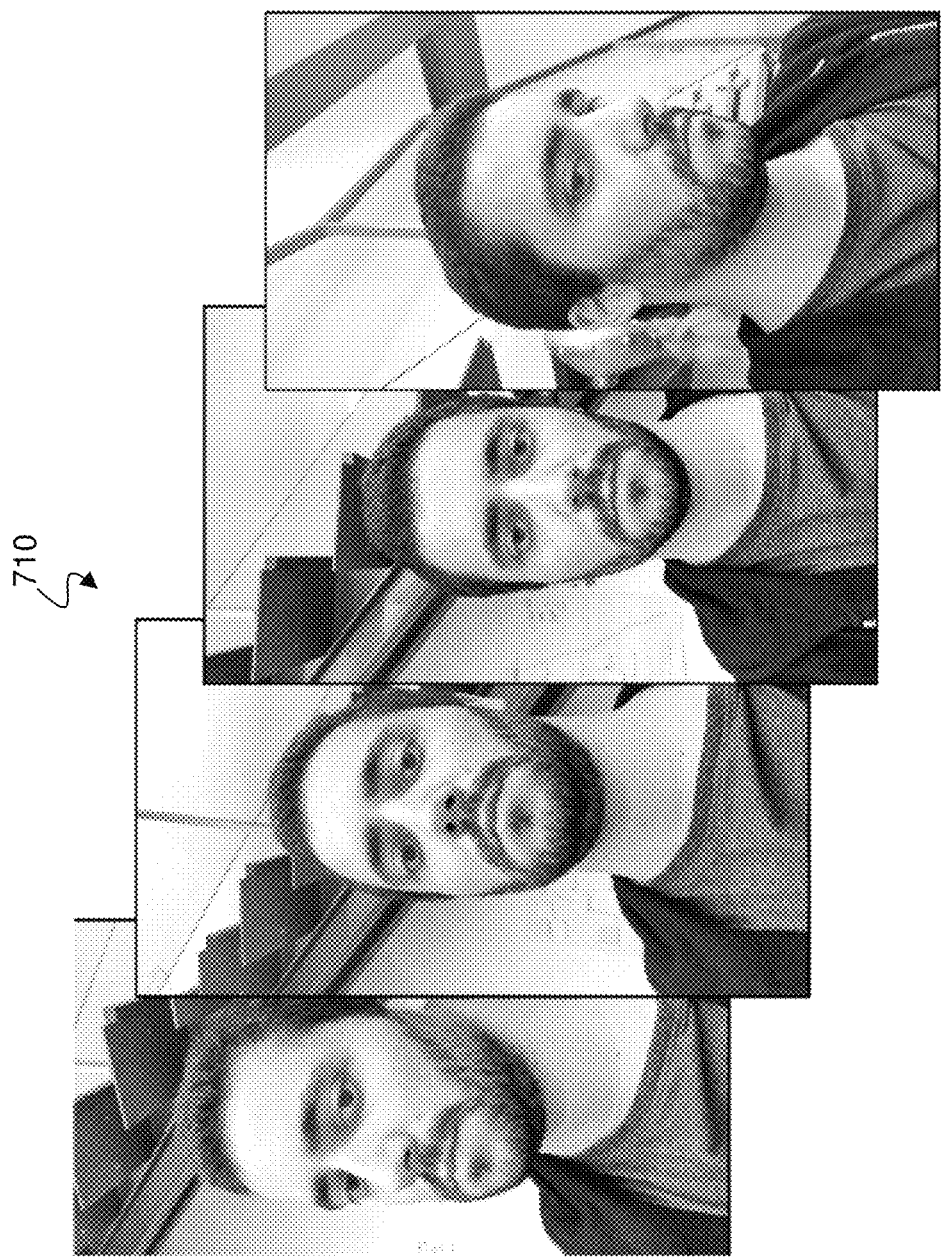
FIG. 7A illustrates example source images, according to some embodiments.

FIG. 7A illustrates example source images 710, according to some embodiments.

Figure 7B:
FIG. 7B illustrates examples (from left to right) of a projected image, blended image, and final model that were generated according to some embodiments, where the source images were those images in the example in FIG. 7A.

FIG. 7B illustrates examples (from left to right) of a projected image 720, blended image 730, and final model 740 that were generated according to some embodiments, where the source images were the example source images in FIG. 7A.

Figure 8:
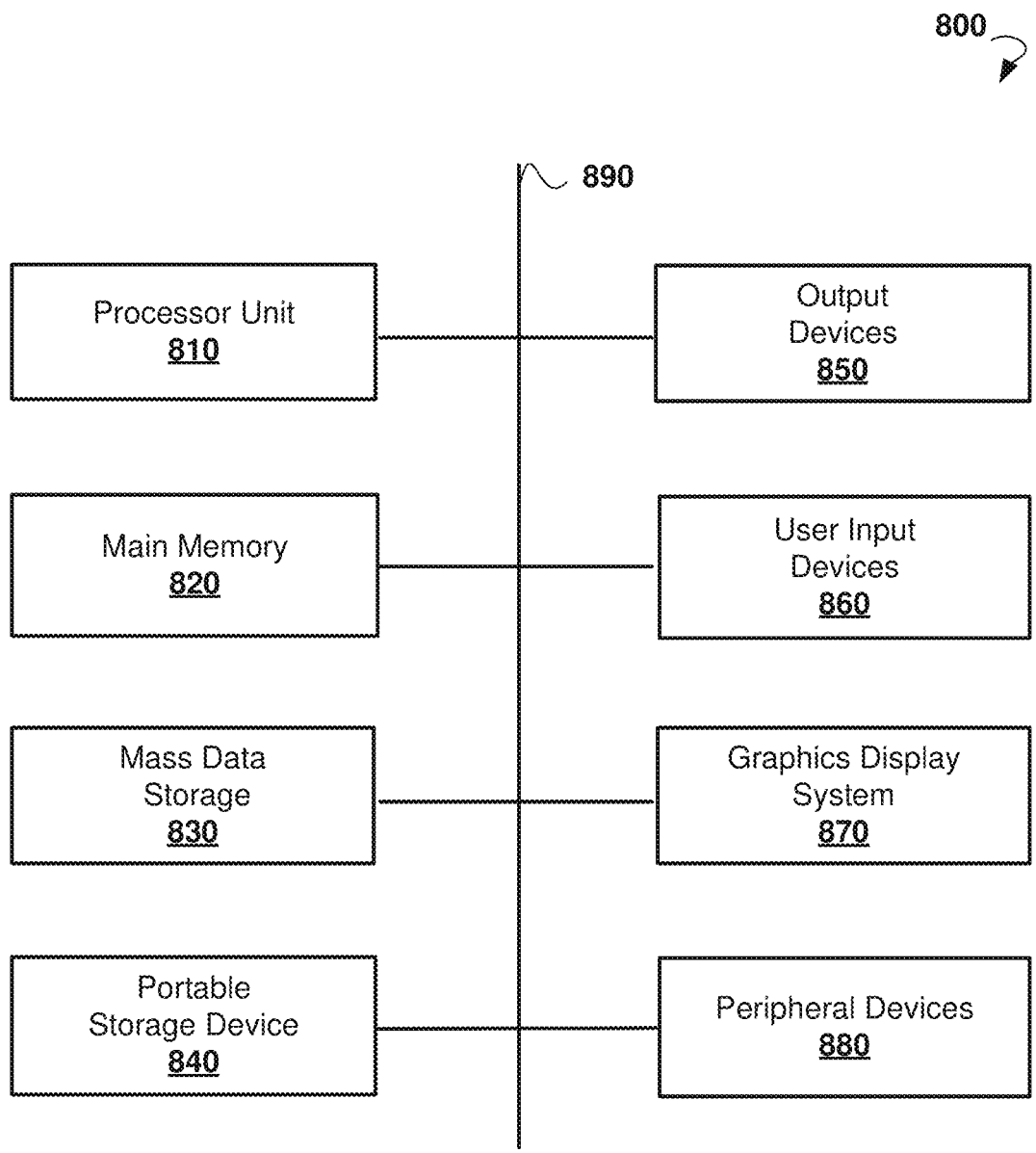
FIG. 8 is a schematic diagram of an example computer device that can be utilized to implement aspects of various embodiments of the present disclosure.

FIG. 8 illustrates an exemplary computer system 800 that may be used to implement some embodiments of the present technology. Computer system 800 may be implemented in the contexts of the likes of computing systems such as server system 210 and client 205. Computer system 800 includes one or more processor units 810 and main memory 820. Main memory 820 stores, in part, instructions and data for execution by processor units 810. Main memory 820 stores the executable code when in operation, in this example. Computer system 800 further includes a mass data storage 830, portable storage device 840, output devices 850, user input devices 860, a graphics display system 870, and peripheral devices 880.

The components shown in FIG. 8 are depicted as being connected via a single bus 890. The components may be connected through one or more data transport means. Processor unit 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or USB storage device, to input and output data and code to and from computer system 800. The system software for implementing embodiments of the present disclosure is stored on such a portable medium and input to computer system 800 via portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, computer system 800 includes output devices 850. Suitable output devices 850 include speakers, printers, network interfaces, and monitors.

Graphics display system 870 includes a liquid crystal display (LCD) or other suitable display device. Graphics display system 870 is configurable to receive textual and graphical information and processes the information for output to the display device. Peripheral devices 880 may include any type of computer support device to add additional functionality to the computer system.

The components provided in computer system 800 are those typically found in computer systems that may be suitable for use with embodiments of the present disclosure and are intended to represent a broad category of such computer components that are well known in the art. Thus, computer system 800 can be a personal computer (PC), hand held computer system, telephone, mobile computer system, workstation, tablet computer, mobile phone, server, minicomputer, mainframe computer, wearable computer, or any other computing system. The computer may also include different bus configurations, networked platforms, multiprocessor platforms, and the like.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, computer system 800 may be implemented as a cloud-based computing environment, such as a virtual machine operating within a computing cloud. In other embodiments, computer system 800 may itself include a cloud-based computing environment, where the functionalities of the computer system 800 are executed in a distributed fashion. Thus, computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as computer system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In some exemplary embodiments, registration is the process of bringing two sets of points into geometric correspondence so that they are as well aligned as possible according to some pre-defined distance metric. One usually distinguishes rigid registration from non-rigid registration. In rigid registration, the spatial transformation used to align the point sets is a rigid transformation, i.e., a translation and a rotation, therefore the point set undergoing the transformation is not deformed. In non-rigid registration, the spatial transformation is searched in a wider class that includes deformations, such as local scaling and local shearing.

According to various exemplary embodiments, a signal may be processed by the expression decomposer with a base mesh from a user to produce a deformed mesh as described and illustrated in U.S. Nonprovisional patent application Ser. No. 17/361,100, filed Jun. 28, 2021, which is incorporated by reference in its entirety herein.

A blend shape (e.g. a morph target) in some exemplary embodiments, is a deformed version of a shape. When applied to a human face, for example, the head is first modelled with a neutral expression and a "target deformation" is then created for each other expression. When the face is being animated, the animator can then smoothly morph (or "blend") between the base shape and one or several blend shapes. Additionally, visemes are blend shapes that represent phonemes, so visemes are visual representations of a sound.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for creating a customized animatable 3D model from a combination of input devices and sensors, the method comprising:

receiving a first input from a first device and a second input from the first device or from at least one other device, each of the first input and the second input comprising a point cloud of an image associated with a face or a head of a user, the first input being associated with at least one sensor on the first device and the second input being associated with the at least one sensor on the first device, at least one different sensor on the first device, or at least one different sensor on the at least one other device;

preprocessing the first input and the second input, the preprocessing comprising determining orientation of the point clouds for the first input and the second input, the orientation of the point clouds of the image in space being unknown based on the first and the second inputs as the at least one sensor on the first device or on the at least one other device is in an unknown position regarding location with respect to the face the user and the determining the orientation for the first input and the second input using photogrammetry includes quantifying each of the point clouds of the images from the first and the second inputs regarding location with respect to the face the user;

registering by means of rigid or non-rigid registration the point clouds from the first and the second inputs to align the preprocessed point clouds to a common reference; and after registering:
automatically detecting one or more features of the registered point clouds;
deforming a template geometry based on the one or more detected features to automatically generate a custom geometry;
determining a texture of the received first and second inputs and transferring the texture to the custom geometry;
deforming a template control structure based on the one or more detected features to automatically generate a custom control structure; and
generating an animatable object having the custom geometry, the transferred texture, and the custom control structure.

2. The method of claim 1, whether texture data is included in the first input and/or the second input, the method further comprising determining the texture comprising using the included texture data for determining depth values for different positions.

3. The method of claim 1, wherein the orientation of the point clouds in space from the first input and the second input are provided in the first input and the second input.

4. The method of claim 1, further comprising estimating the orientation in space of the point cloud from the second input.

5. The method of claim 4, wherein the second input from the at least one other device includes at least one two-dimensional image.

6. The method of claim 1, wherein the at least one sensor of the first device includes a dot projection sensor and/or a Time of Flight sensor; wherein the at least one sensor of the first device provides low resolution texture data or lacks texture data.

7. The method of claim 1, wherein the at least one other device provides high quality texture data and includes at least one camera rig, at least one depth sensor, or at least one structured light sensor (SLS), or a combination thereof.

8. The method of claim 1, wherein the first input and the second input each includes at least one of an image, a video signal, an audio signal, and a 3D scan.

9. The method of claim 1, wherein the transferring the texture to the custom geometry includes automatically mapping at least one pixel of the texture to a corresponding vertex on the custom geometry.

10. The method of claim 1, wherein the automatically detecting the one or more features includes determining a set of spatial coordinates, each spatial coordinate associated with one of the one or more features of the received first and second inputs.

11. The method of claim 1, wherein a set of features of the template geometry corresponds to the one or more detected features, the deforming the template geometry including matching the one or more detected features to the set of features of the template geometry.

12. The method of claim 11, wherein the deforming the template geometry to automatically generate the custom geometry uses radial basis functions.

13. The method of claim 1, wherein a set of control elements of the template control structure corresponds to a subset of the one or more detected features including a bone-based rig, a viseme set, or a blend shape, the deforming the template control structure including matching the subset of the one or more detected features to the set of control elements of the template control structure.

14. The method of claim 1, wherein the method runs on a server coupled via at least one network to the first device and the at least one other device.

15. The method of claim 1, wherein the at least one other device includes one or more of a camera, smart phone, depth sensor, time of flight sensor, a device that can scan in three dimensions (3D), and structured light sensor, or combinations thereof.

16. A system for automatically generating an animatable object, the system comprising:
a processor; and
a memory for storing executable instructions, the processor executing the instructions to:
receive a first input from a first device and a second input from the first device or from at least one other device, each of the first and the second input comprising a point cloud of an image associated with a face or head of a user, the first input being associated with at least one sensor on the first device and the second input being associated with the at least one sensor on the first device, at least one different sensor on the first device, or at least one different sensor on the at least one other device;
preprocess the first and the second input, comprising:
determining orientation of the point clouds for the first input and the second input, the orientation of the point clouds of the image in space being unknown based on the first and the second inputs as the at least one sensor on the first device or on the at least one other device is in an unknown position regarding location with respect to the face of the user and the determining the orientation for the first input and the second input using photogrammetry includes quantifying each of the point clouds of the images from the first and the second inputs regarding location with respect to the face the user;
register by means of rigid or non-rigid registration the point clouds from the first and the second inputs to align the preprocessed point clouds to a common reference; and
after registering:
automatically detect one or more features of the registered point clouds;
deform a template geometry based on the one or more detected features to automatically generate a custom geometry;
determine a texture of the received first and second inputs and transferring the texture to the custom geometry;
deform a template control structure based on the one or more detected features to automatically generate a custom control structure; and generate an animatable object having the custom geometry, the transferred texture, and the custom control structure.

17. The system of claim 16, wherein vertices of the custom geometry are based on spatial coordinates determined from the one or more detected features of the received first and the second input; and wherein control elements of the custom control structure are based on spatial coordinates determined from the one or more detected features of the received first and the second input.

18. The system of claim 16, wherein the automatically detecting the one or more features, the deforming the template geometry, the transferring the texture, and the deforming the template control structure are being performed in real-time.

19. A system for creating a customized animatable 3D model from a combination of input devices and sensors, the system comprising:
- means for receiving a first input from a first device and a second input from the first device or from at least one other device, each of the first input and the second input comprising a point cloud of an image associated with a face or a head of a user, the first input being associated with at least one sensor on the first device and the second input being associated with the at least one sensor on the first device, at least one different sensor on the first device, or at least one different sensor on the at least one other device;
- means for preprocessing the first input and second input, the preprocessing comprising:
  - determining orientation of the point clouds for the first input and the second input, the orientation of the point clouds of the image in space being unknown based on the first and second inputs as the at least one sensor on the first device or on the at least one other device is in an unknown position regarding location with respect to the face of the user and the determining the orientation for the first input and the second input using photogrammetry includes quantifying each of the point clouds of the images from the first and the second inputs regarding location with respect to the face of the user;
- means for registering the point clouds from the first and the second inputs to align the preprocessed point clouds to a common reference; and
- after registering:
  - means for automatically detecting one or more features of the registered point clouds;
  - means for deforming a template geometry based on the one or more detected features to automatically generate a custom geometry;
  - means for determining a texture of the received first and second inputs and transferring the texture to the custom geometry;
  - means for deforming a template control structure based on the one or more detected features to automatically generate a custom control structure; and
- means for generating an animatable object having the custom geometry, the transferred texture, and the custom control structure.

* * * * *